UNITED STATES PATENT OFFICE.

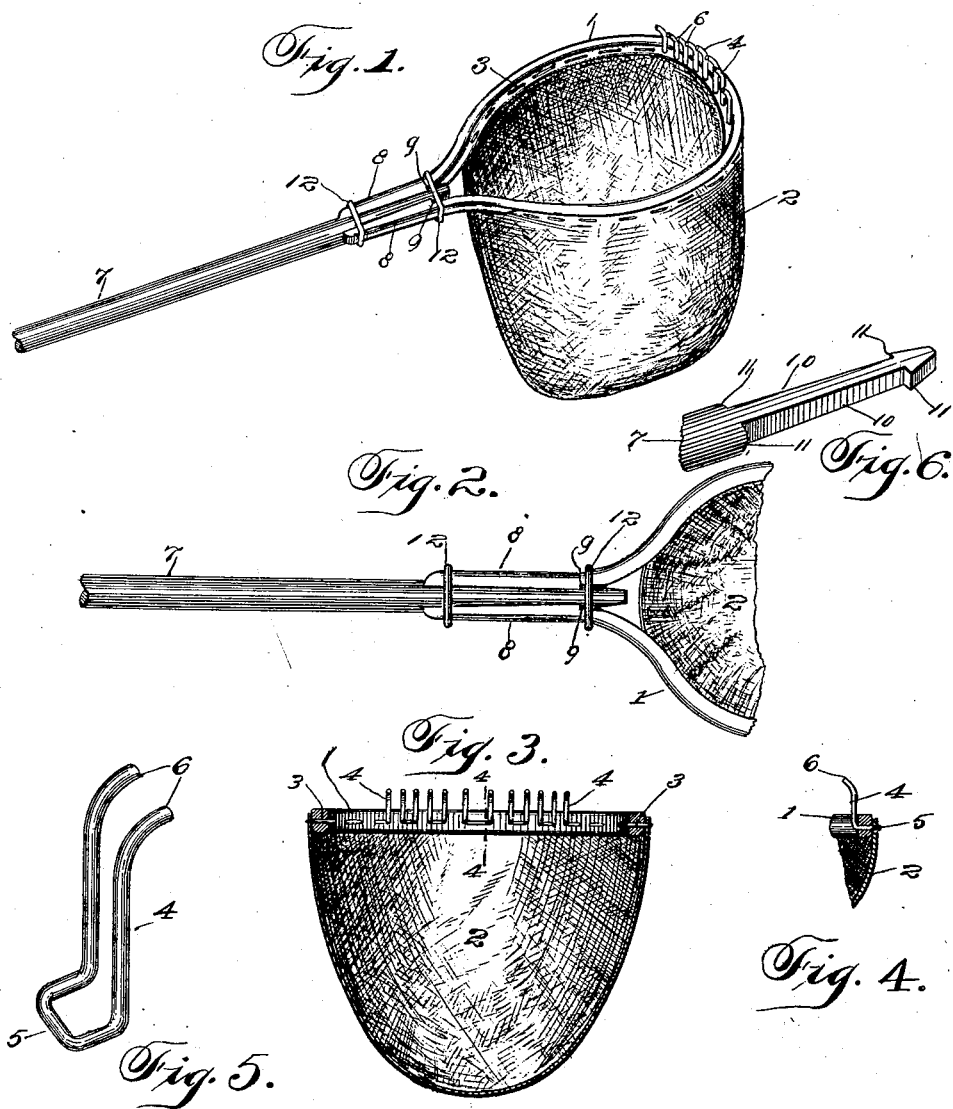

THEODORE H. KRUSE, OF MONTROSE, COLORADO.

FRUIT-PICKER.

SPECIFICATION forming part of Letters Patent No. 668,715, dated February 26, 1901.

Application filed December 8, 1900. Serial No. 39,204. (No model.)

*To all whom it may concern:*

Be it known that I, THEODORE H. KRUSE, a citizen of the United States, residing at Montrose, in the county of Montrose and State of Colorado, have invented a new and useful Fruit-Picker, of which the following is a specification.

This invention relates to fruit-pickers, and has for its object to provide an improved device of this character for facilitating the picking of fruit from trees while the operator stands upon the ground and arranged to collect and hold the fruit, so as to prevent the same from dropping to the ground and being bruised and otherwise damaged.

With this and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a fruit-picker constructed in accordance with the present invention. Fig. 2 is a top plan view thereof, showing the connection between the handle and the frame or head for supporting the bag for containing the fruit. Fig. 3 is a detail transverse sectional view taken through the head and the bag and looking toward the teeth of the head. Fig. 4 is a detail sectional view taken on the line 4 4 of Fig. 3. Fig. 5 is a detail perspective view of one of the picking-teeth. Fig. 6 is a detail perspective view of the inner end of the detachable handle.

Like characters of reference designate corresponding parts in all of the figures of the drawings.

Referring to the drawings, 1 designates the frame for the head of the device, which is formed from a strip of wood bent into a substantially circular loop, the bowed portion being provided with a plurality of perforations. A suitable bag 2 has its mouth portion or edge applied to the outer side of the loop-shaped frame, so as to embrace the same, and is connected thereto by means of a lacing 3, which passes through the bag and the several perforations in the frame, whereby the mouth of the bag is held distended by the frame or head.

At the outer or forward end of the head or frame there is provided a plurality of fruit-picking teeth 4, one of which has been shown in detail in Fig. 5 of the drawings. Each tooth is formed from a single piece of stiff wire, which is bent intermediate of its ends into substantially U shape, so as to form two prongs, the intermediate bowed portion or transverse head 5 being bent laterally outward at substantially right angles to the plane of the prongs and the outer extremities of the latter being curved or bowed laterally outward, as at 6, in a direction opposite to that of the head portion 5. In securing the teeth to the frame 1 the prongs of each tooth are inserted inwardly through a pair of corresponding perforations in the frame and also through the bag, so that the teeth also serve to form an additional fastening for the bag. After the prongs have been passed through the perforations until the transverse portion 5 is drawn firmly against the frame the prongs are then bent laterally outward across the frame, so as to project above the upper edge thereof, the bent extremities 6 having a slight inward inclination. It will be understood that the shanks of the prongs lie in contact with the inner side of the frame, whereby the teeth are fixedly connected to the frame without the aid of additional fastenings.

For manipulation of the device I provide a handle 7, which has its inner end detachably held between the extended ends of the strip which forms the frame or head of the device. In the original formation of the loop-shaped head-frame the opposite ends of the strip of wood are extended laterally outward in the same direction, so as to form the opposite spring-jaws 8, which are provided with the corresponding notches 9, formed in their inner edges and at their inner ends. Adjacent to the inner end of the handle and in opposite sides thereof there are provided the corresponding longitudinal recesses 10, the opposite ends of which form lateral shoulders 11. In assembling the handle and the head-frame the inner end of the former is introduced longitudinally between the opposite spring-jaws of the head, the inner end of the handle being tapered, so as to facilitate the introduction thereof. As the handle is forced forwardly, the jaws snap into the corresponding recesses thereof, which are equal in length to the distance between the outer ends of the jaws and the shoulders formed by the notches 9. The opposite clamping-bands 12 are then slipped over the jaws from the outer end of the handle, and the connection between the latter and the head-frame is complete. The bands are designed to prevent accidental lateral displacement of the jaws from the recess in the handle and may be removed for the interchange of handles of different lengths, so as to accommodate a single device to trees of different heights. Longitudinal separation of the parts is prevented by the interlocking of the outer ends of the spring-jaws with the adjacent shoulders of the handle and by the opposite shoulders of the handle and the jaws.

What is claimed is—

1. A fruit-picker, comprising a head-frame, a bag suspended therefrom, and picker-teeth carried by the frame, each tooth being substantially U-shaped, and having its prongs passed transversely through perforations in the frame, and then bent transversely across the opposite side thereof.

2. A fruit-picker, having a head-frame, provided with a marginal series of perforations, a bag suspended from the head, and a plurality of picker-teeth, each tooth being of substantially U shape, and having its prongs passed transversely inward through the bag and corresponding perforations in the frame, the prongs then being bent laterally outward across the inner side of the frame, and forming fastenings for the bag.

3. A fruit-picker, having a head-frame, provided with opposite coöperating spring-jaws, which are provided with corresponding inner shoulders, a handle, having opposite longitudinal recesses, the jaws being snugly received within the corresponding recesses, with their ends against the corresponding ends of the recesses, and their shoulders abutting against the opposite ends of the recesses, and one or more clamping-bands detachably embracing the jaws and the handle.

4. A fruit-picker, having a head-frame, picker-teeth thereon, a bag suspended from the frame, opposite spring-jaws carried by the frame, a handle held between the jaws, each of the latter having a longitudinally-interlocked engagement with the adjacent side of the handle, and one or more clamping-bands detachably embracing the jaws and the handle.

5. A fruit-picker, having a loop-shaped head-frame formed from a single strip of wood, the ends of the strip being extended laterally outward into spring-jaws having corresponding notches in their inner sides and at or adjacent to their inner ends, a detachable handle having its inner end tapered, and also provided with longitudinal recesses in opposite sides thereof, the spring-jaws being snapped into the corresponding recesses, with their outer ends abutting against the inner ends of the recesses, and the opposite shouldered ends of the recesses being received within the notches of the jaws, and one or more clamping-bands detachably embracing the jaws and the handle.

In testimony that I claim the foregoing as my own I have hereto affixed my signature in the presence of two witnesses.

THEODORE H. KRUSE.

Witnesses:
ELMER JENNISON,
J. A. BENNETT.